Oct. 28, 1958     R. F. JOHNSTON     2,857,969
READING AND PUNCHING DEVICE
Filed Dec. 5, 1955     6 Sheets-Sheet 1

Oct. 28, 1958 R. F. JOHNSTON 2,857,969
READING AND PUNCHING DEVICE
Filed Dec. 5, 1955 6 Sheets-Sheet 2

Inventor
Robert Fraser Johnston
by Thomas Davis Keller & Mesher
his attorneys

Oct. 28, 1958
R. F. JOHNSTON
2,857,969
READING AND PUNCHING DEVICE
Filed Dec. 5, 1955
6 Sheets-Sheet 3
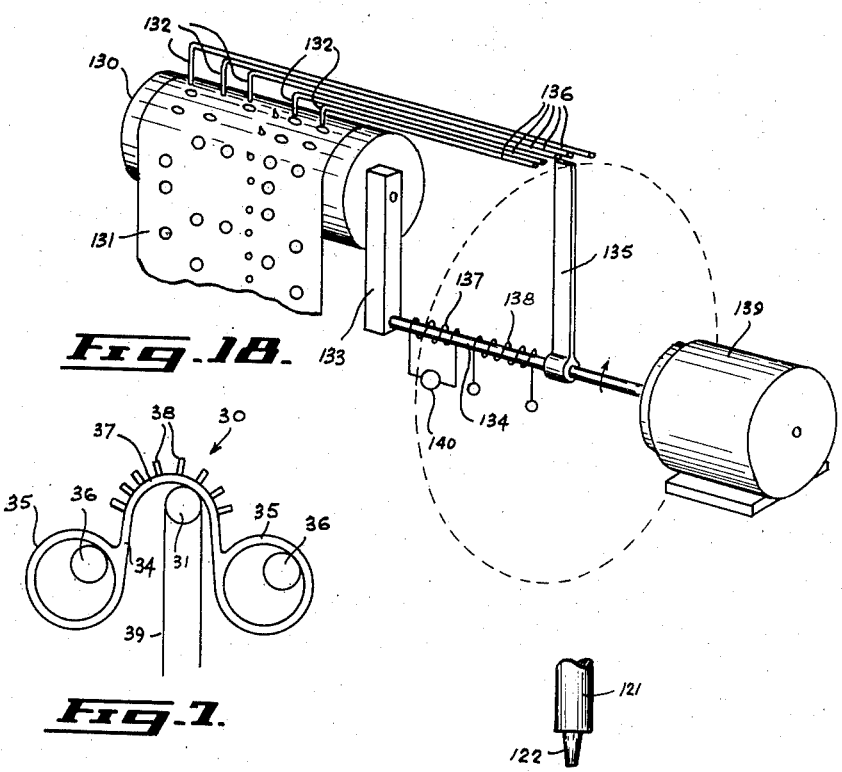
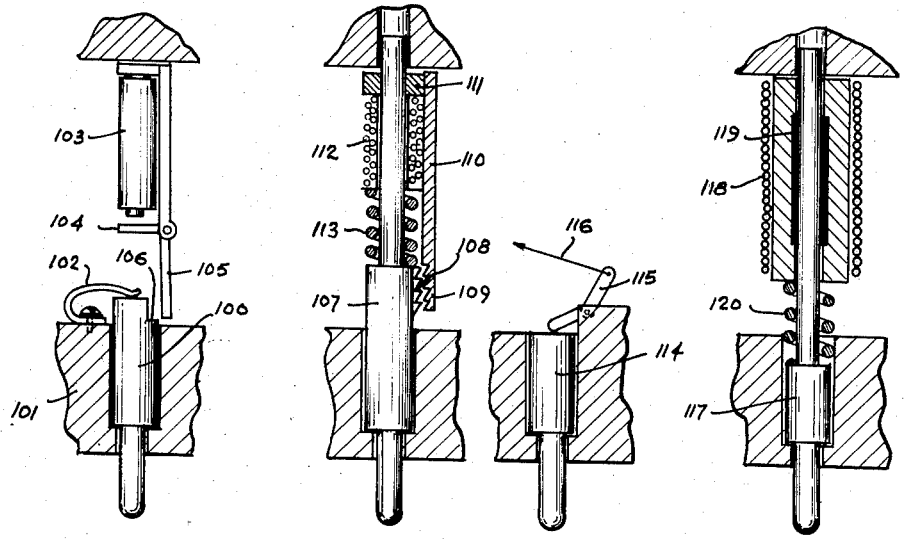
Inventor
Robert Tracy Johnston
by Stevens, Davis, Miller & Mosher
his attorneys Oct. 28, 1958

R. F. JOHNSTON 2,857,969

READING AND PUNCHING DEVICE

Filed Dec. 5, 1955

Inventor
Robert F. Johnston
by
his attorneys

Oct. 28, 1958  R. F. JOHNSTON  2,857,969
READING AND PUNCHING DEVICE
Filed Dec. 5, 1955  6 Sheets-Sheet 5

Inventor
Robert Mauer Johnston
by Stevens, Davis, Miller & Mosher
his attorneys

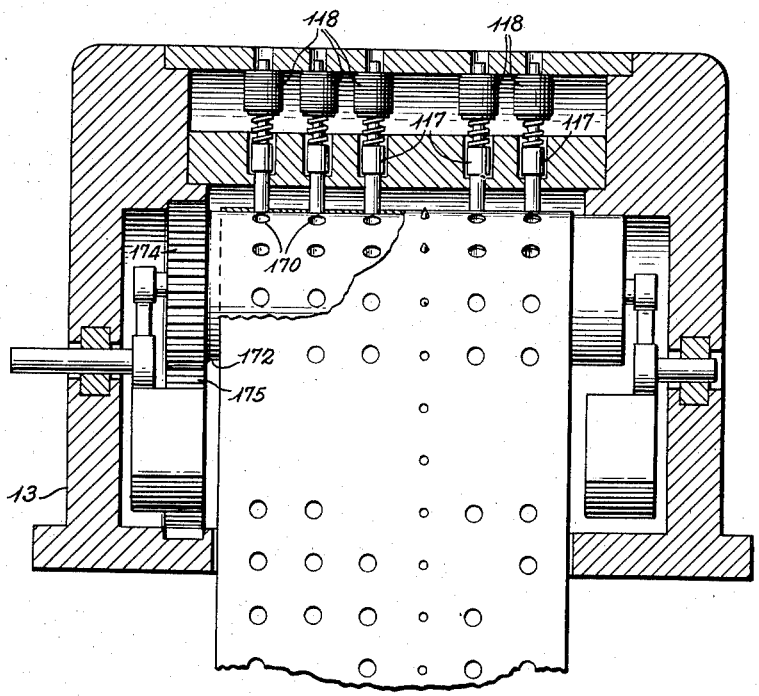

United States Patent Office 2,857,969
Patented Oct. 28, 1958

2,857,969

READING AND PUNCHING DEVICE

Robert Fraser Johnston, Toronto, Ontario, Canada, assignor to Adalia Limited, Montreal, Quebec, Canada Application December 5, 1955, Serial No. 551,147

Claims priority, application Canada October 19, 1955

18 Claims. (Cl. 164—90)

This invention relates to the recording and reproducing of information stored on flexible record sheets, more particularly those of the punched type, that is to say individual cards or continuous tapes that are provided with or adapted to receive punched holes, the presence or absence of holes in various selected areas of the record sheet representing, in coded form, the information that is to be stored and subsequently reproduced.

One object of the invention is to provide means for feeding a continuous punched tape or a series of separate punched cards at a high rate through a device in which the information represented by the holes punched in such record sheet is read simply, reliably and quickly.

A further object of the invention is to provide a device for punching the holes in such a record sheet in a similar rapid and reliable manner.

It is particularly an object of the invention to provide a single device which may serve for both the aforementioned purposes, namely, either reading or punching, without the necessity of any structural changes being made to the device.

To this end, a device has been developed in accordance with the present invention for reading or punching a flexible record sheet, such device comprising a shell having a concave partially cylindrical surface; at least one radially movable pin that may constitute either a feeler or punch, said pin being urged to project from said surface; a cylindrical roller of lesser external diameter than twice the radius of curvature of said concave surface; and means for causing relative movement between said roller and said shell such that relatively to said shell the central longitudinal axis of said roller describes a circular orbit about the longitudinal axis of said concave surface while said roller itself rotates about its central longitudinal axis with its outer surface in rolling contact with said concave surface and with the record sheet interposed therebetween, and such that said orbital movement of said roller is effective to cause stepwise advancement of said record sheet to bring successive areas thereof into contact with said pin; and either means for detecting outward radial movement of said pin when employed as a feeler, or means for locking said pin in its projecting position to use it as a punch.

As an alternative to reading a punched record sheet, the device may be adapted for the detection of some other property of the medium constituting such record sheet, such as physical thickness, electrical or optical conductivity or colour variations. In such cases the feelers will be modified accordingly to be sensitive to the property selected.

To effect the relative orbital movement, it will normally be convenient to fix the shell and cause the roller to rotate within the shell as well as about its own central longitudinal axis. This motion can be simply obtained by mounting the roller for free rotation on the ends of a pair of crank arms that are rotated about the central longitudinal axis of the concave surface of the shell, the roller being in rolling contact with the concave surface of the shell. Alternatively, such orbital movement may be obtained by mounting the roller in fixed bearings for rotation about its central longitudinal axis. It will then be necessary to impart a rotary oscillation to the shell in order to produce the required relative orbital movement between shell and roller. This may conveniently be carried out by similar crank arms or eccentric devices.

As mentioned above the cylindrical roller must be of lesser external diameter than twice the radius of curvature of said concave surface, that is to say, the internal diameter of the shell if it were to form a complete cylinder. This relationship is necessary to ensure stepwise advancement of the record sheet. In practice more than one feeler or punch will normally be employed, and in particular, a plurality of feeler or punches disposed in a circumferentially extending series may be adopted with advantage. More than one such series may be arranged side by side disposed axially along the shell so as to form rows and columns of such feelers or punches (the rows extending axially, and the columns extending circumferentially and each constituting one of the aforementioned "series"). Such a group of series arranged side by side will be called a block; the circumferential length of a block is equal to the circumferential length of its longest series. More than one such block may be arranged end to end disposed circumferentially around the shell.

In this case, it will be required that the rollers should be effective on each orbital revolution to present to the feelers or punches of each series a block of areas of the record sheet separate and distinct from the block of areas of the record sheet presented to the feelers or punches of the same series during the preceeding orbital revolution. In other words, the record sheet should advance during each orbital revolution sufficiently for the area thereof previously presented to the rearmost feeler or punch or row of feelers or punches in a block (in the direction of travel of the record sheet) to pass beyond the foremost feeler or punch or row of feelers or punches in the same block. For this action to take place, it will be necessary that the difference between $2\pi$ times the radius of curvature of the concave cylindrical surface (which is the circumference on which the roller rolls) and $\pi$ times the diameter of the roller (which is the circumference of the roller) should be at least as great as the length of the longest block of feelers or punches, for this difference is the distance which the record sheet will advance during one orbital revolution.

The accompanying drawings diagrammatically illustrate various devices incorporating features according to the present invention. In these drawings:

Figure 7 is a schematic end view of the reader seen in Figure 6, illustrating its function;

Figure 13 shows one form of pin mechanism which may serve either as a feeler or as a punch;

Figure 23:
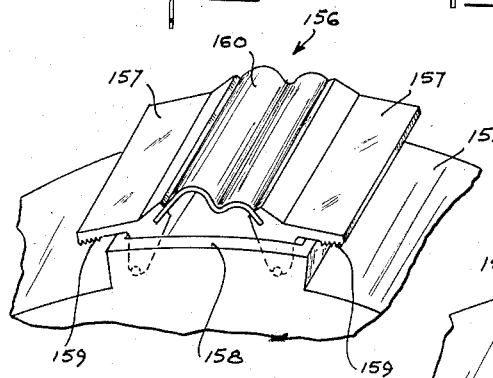
Figure 24:
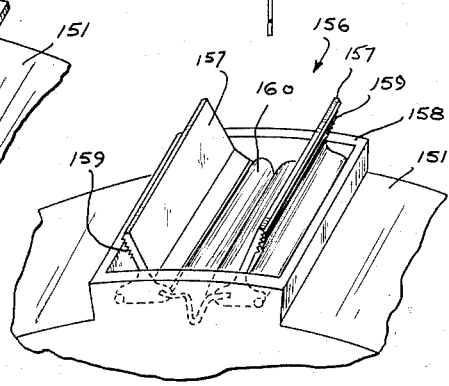
Figure 19:
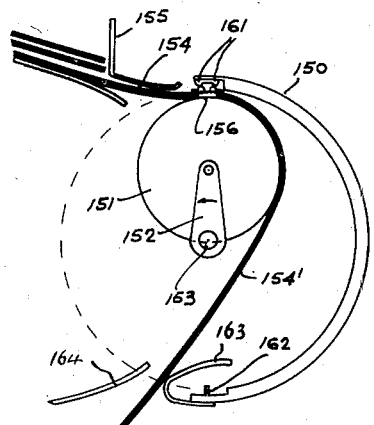
Figure 20:
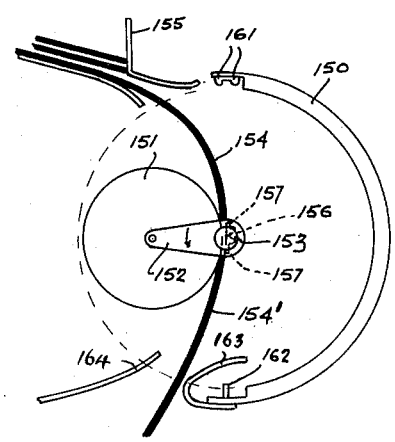
Figure 21:
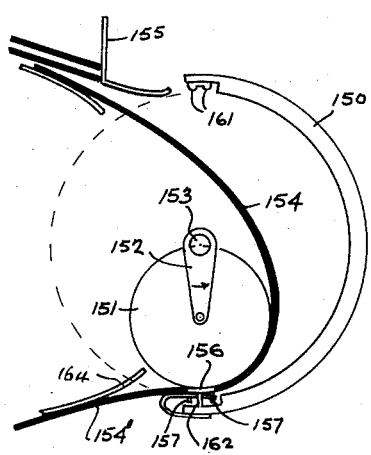
Figure 22:
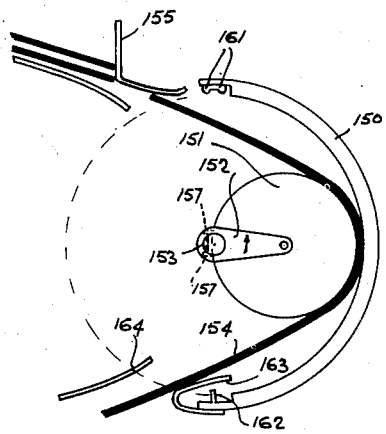

Figures 14 to 16 each illustrate a modified form of the pin mechanism seen in Figure 13;

Figure 17 shows a fragment of a further modified form of such a pin;

Figure 18 illustrates schematically a form of magnetic commutator that may be incorporated in a reader or punch according to the invention;

Figure 19 is a diagrammatic end view of a reader or punch according to the invention, modified for operating with individual record sheets;

Figures 20 to 22 are similar to Figure 19, each showing the parts in a different position;

Figure 23 is an enlarged fragmentary view of a card-gripping device employed in the apparatus illustrated in Figures 19 to 22;

Figure 24 shows the same parts as Figure 23 in another position; and

Figure 25 is a central longitudinal section of one modification of the invention for use as a punch or a reader using the pin structure illustrated in Figure 16.

Reference will first be made to Figures 1 to 5. These figures illustrate a reader 1 which consists of a semi-cylindrical shell 2 secured to a fixed base 3, and serving to mount a number of radially movable electrical contacts 4. These contacts 4 are arranged along and around the periphery of the shell 2 in eight rows of five contacts and five columns or "series" of eight contacts. Each contact 4 is individually urged inwardly by a spring 5, its movement being limited by a shoulder 6 that engages a complementary abutment surface 7 on the shell 2.

Within a generally cylindrical space defined by the shell 2, the base 3 and a pair of end pieces 13, there is mounted a read-out roller 8. This roller 8 is freely rotatably mounted on a shaft 8a that together with a pair of crank-arms 9 extending outwardly from a shaft 10 forms a rigid crankshaft assembly which is supported in fixed bearings 11 mounted between the end pieces 13 and the base 3. Counter-weights 12 are also connected to the shaft 10 to balance the weight of the roller 8. The end pieces 13 serve also, together with the base 3, to support the shell 2. The reader 1 is enclosed by a semi-cylindrical cover 14 mounted over the shell 2 between the end pieces 13. The cover 14 serves to mount the springs 5 that act on the contacts 4.

The end pieces 13 serve to define with the base 3 a short cylindrical recess 15 at each end of the device. The radius of each of these cylindrical recesses 15 is equal to the length of each crank-arm 9 plus the radius of the roller 8, so that the ends of the roller 8 will each tightly engage the cylindrical surface of one of such recesses 15.

The contacts 4 are mounted in the shell 2 to be slidable radially of the shaft 10 and perpendicular to the axis of such shaft. The innermost ends of all these contacts 4 normally (i. e. when the shoulders 6 are pressed against the surfaces 7 by the springs 5) lie on the surface of an imaginary cylinder concentric with the shaft 10. The diameter of this imaginary cylinder is slightly less than that of the recesses 15, so that movement of the roller 8 into engagement with a row of contacts 4 will tend to move such contacts slightly radially outwardly against the pressure of their springs 5, thus ensuring firm electrical contact between such contacts and the roller itself, provided no non-conducting material is interposed.

The punched paper tape 16 to be read is threaded through the reader 1 to extend around the roller 8. The tape 16 enters and leaves the device through two slots 17 and 18 situated in the base 3 opposite the shell 2. In the example chosen, the tape 16 is of the type having a series of transverse rows of positions in which punched holes may appear, the number and position of the holes in each line forming a code that is to be interpreted by the reader 1. The positions that the holes may occupy form five columns disposed along the tape 16, two columns being on one side and three columns being on the other side of a series of sprocket holes 19. The roller 8 is provided with a corresponding series of sprocket teeth 19' extending circumferentially around its surface at a suitable longitudinally intermediate point to engage the holes 19 and insure synchronized travel of the tape 16 and the roller 8.

The device is completed by a pair of contacts 20 and 21 mounted in a recess 22 in the base 3. The contact 20 is arranged deep in the recess 22, but part of the contact 21 projects from this recess to lie in the path of travel of the roller 8. Movement of the roller 8 past the contact 21 will act to force it inwardly of the recess 22 into engagement with the contact 20.

Figure 1:
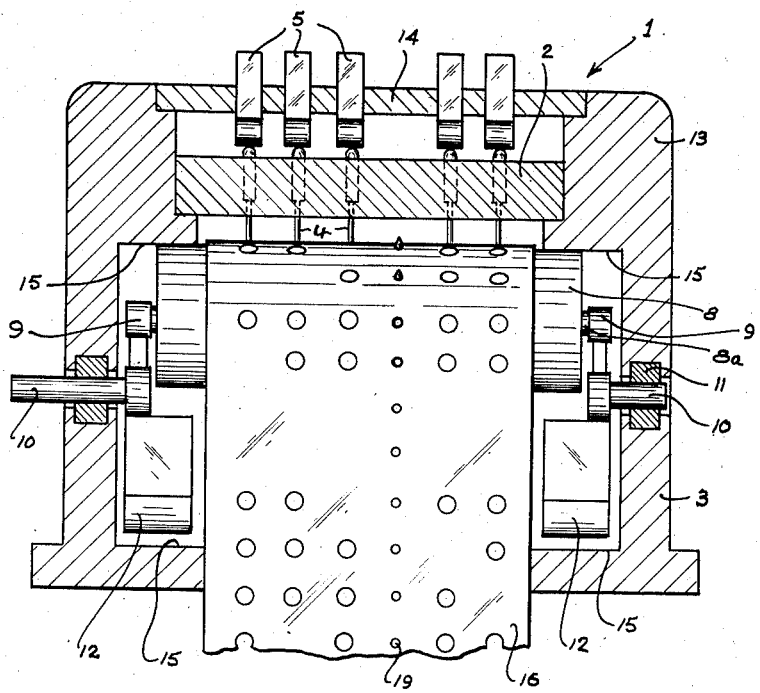
Figure 1 is a central longitudinal section of a first form of device for use as a reader for punched paper tape.
Figure 2:
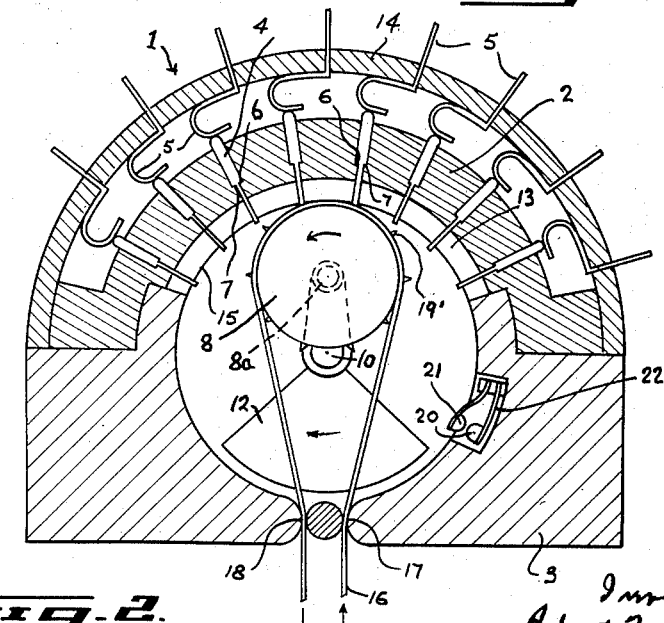
Figure 2 is a transverse section of the reader seen in Figure 1.
Figure 3:
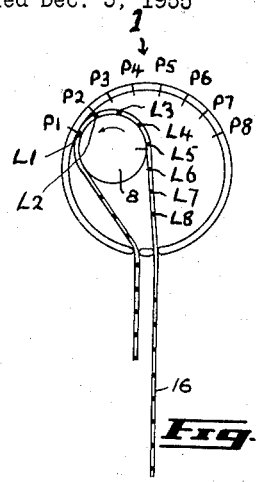
Figure 3 is a simplified diagram illustrating the passage of paper tape through the reader seen in Figures 1 and 2.
Figure 4:
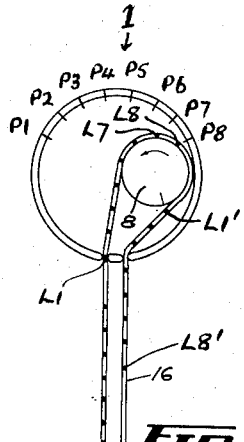
Figure 4 is a diagram similar to Figure 3 with the parts in a different position.
Figure 5:
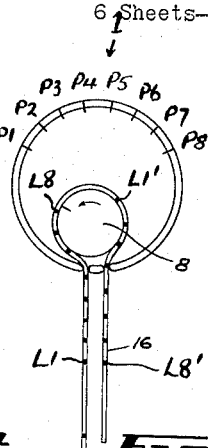
Figure 5 is a further diagram similar to Figures 3 and 4 but with the parts in yet another position.

Rotation of the shaft 10 will be transmitted through the crank-arms 9 to the roller 8 the surface of which is in frictional contact with the cylindrical surfaces of the recesses 15. The roller 8 will thus be caused to rotate about its shaft 8a so as to roll its surface against those of the recesses 15. If the shaft 10 is rotated clockwise, as seen in Figure 2, the roller 8 will rotate anti-clockwise about its bearings at the ends of the crank-arms 9 while executing a clockwise orbital movement. This orbital movement can best be appreciated from Figures 3, 4, and 5, which also serve to illustrate the movement of the paper tape that will result from the movement of the roller. Figure 3 shows the initial position with the roller 8 at the beginning of a cycle. Each row of contacts 4 is here illustrated by one of the points P1, P2, P3, P4, P5, P6, P7, P8; and lines of punched holes on the tape 16 are designated by the reference numerals L1, L2, L3, L4, L5, L6, L7, L8. In the initial position shown in Figure 3, the line L1 is in register with the row P1 and it will be clear that as the roller 8 describes its clockwise orbital movement, the lines L2, L3, etc., will each respectively come successively into register with a corresponding row P2, P3, etc., until the position illustrated in Fig. 4 is achieved where the line L8 is just moving out of register with the row P8. Continued rotation of the shaft 10 causes the roller 8 to pass through the position illustrated in Figure 5 before again coming into a position similar to that shown in Figure 3 with a fresh line L1' about to come into register with the row P1. The eight rows P1 to P8 thus have presented to them a series of lines L1 to L8 on the tape; and after an interval, the same action is repeated with a fresh set of lines L1' to L8', this operation continuing indefinitely. In this manner a block of eight lines of holes on the tape is read during each revolution of the shaft 10. Such "reading" is affected by the contacts 4 which act as feelers by making electrical contact with the roller 8 only when a punched hole appears in register with such contact 4 in the line of holes presented to the row of contacts concerned. Each contact 4 is electrically insulated from all the other contacts 4, and the surface of the roller 8 is suitably electrically connected to the exterior of the reader, conveniently by means of the shaft 10. An electrical impulse will thus appear between the corresponding contact 4 and a common return path when a hole aligned with such contact is present in the line of holes in the tape 16 presented to the row of contacts of which such contact is a member. The impulses appearing at the various individual contacts of each row of contacts are thus indicative of the information represented by the corresponding line of punched holes in the tape.

If frictional engagement of the roller 8 with the cylindrical surfaces of the recesses 15, is found insufficiently positive to ensure correctly synchronised feeding of the paper tape 16, then a system of gears may be employed. Thus a spur gear can be provided on one or both ends of the roller 8 each meshing with an internally toothed ring gear fixedly mounted in a recess 15. The spur gear will then roll around the ring gear as a planet wheel, resulting in exactly the same motion as already described. The possibility of slip between the parts is, however, eliminated.

This device is particularly suited to act as a punched tape reader for a parallel digital computer. Each of the forty contacts is connected directly to one stage of a forty stage parallel storage register, which is initially set to the "0" condition. The shaft 10 is then rotated through one revolution. At some time during this revolution each of the forty hole positions in the next block of holes on the tape is read by its corresponding contact. If a hole is present, the corresponding register stage is set to the "1" condition. After the roller 8 has passed all forty contacts, it closes the contacts 20 and 21 (Fig. 2) and thus sends a pulse to the computer indicating that the block has been read. The computer can then either gate the contents of the register to another stage while re-setting the register to zero and waiting for the next block of intelligence, or it can stop the reader and carry on with computing.

A reader of this character has many desirable practical advantages. Except for the feeler contacts which move a very short distance (for example 0.01 inch) and the paper tape, the reader has only two moving parts. There is a complete absence of the cams and mechanical linkages normally used so extensively in other equipment constructed to perform the same function. It follows that the reader is both inexpensive to manufacture and to maintain; and it may also be expected to have a long life. A reader built to handle standard teletype tape would measure about 1½" long and 1½" in diameter, exclusive of a driving motor.

A further important aspect of this method of feeding paper tape is the smooth acceleration and deceleration that is imparted to the paper. The velocity of any given point on the paper feeding through the device is approximately sinusoidal. The forces build up gradually and there is no jerking of the paper. At least four sprocket holes can be engaged simultaneously so that the paper driving force may be distributed amongst them. These factors result in a minimum of tendency to tear the paper. The reader 1 reads one block of tape per revolution of the central shaft, and it is expected that shaft speeds of up to 50 revolutions per second will be possible in view of the smoothness of paper feed. This corresponds to a reading speed of 500 lines on the tape per second.

Ability to connect a reader of this type directly to a parallel type computer with no buffering circuitry arises from the fact that all holes in a block of tape can be read substantially simultaneously and independently. All the feeler contacts are independent of one another, and since each is required to operate only sometime during each revolution of the shaft, the exact time of operation during the revolution or the order in which the parts operate becomes immaterial.

In practice it is often desirable to be able readily to stop and start the reader between blocks on the tape. This necessitates positive stopping and starting action with fast acceleration and deceleration, which is often difficult to accomplish by simply energising and deenergising the motor, because of the relatively high inertia of the motor rotor. For this reason it is often preferred to employ clutches for stopping and starting. A mechanical ratchet type clutch may be employed for stopping and starting and is satisfactory up to moderate speeds. At higher speeds the inertia of the crankshaft and roller become significant and it is often mechanically difficult to stop and start. It may then be desirable to stop the reader by leaving the crankshaft rotating continuously at a uniform speed, and rotating the part of the normally fixed structure of the reader engaged by the roller. This expedient is especially suitable when an internally toothed ring gear is used to engage a spur gear on the roller. If, instead of remaining fixed, the ring gear is rotated at half the speed of the crankshaft and in the same direction (assuming a diameter ratio of 2:1), the paper will not be advanced when the crankshaft rotates, since the roller will have only a pure orbital motion and no rotation abouts its own axis relatively to the fixed structure of the reader. Stopping and starting the ring gear involves only the inertia of this gear and of the roller about its own axis and this inertia can be kept very small by suitable design. The ring gear can be driven by a gear mechanism linked with the main shaft and more than one speed of rotation can be arranged, one for stopping the feed as just described and two faster speeds, one in each direction for fast run-out, since it is often desirable to be able to run tape through the reader at high speed without reading. A simple friction clutch can be used for run-out instead of the ratchet type necessary to ensure the exact predetermined speed required for stopping.

When using this principle for stopping or speeding up the paper feed, it is necessary to remove the feeler pins so that they do not tear the paper. Rather than lift each pin individually, it is normally easier to lift the whole shell carrying the pins. This can be done in a number of ways, and is conveniently adaptable to a type of construction having the whole outer shell hinged so that it can be raised for inspection of the roller and other parts.

Reference will now be made to the modified form of reader illustrated in Figures 6 and 7. These views show a reader 30 in which a roller 31 is mounted in fixed bearing in a pair of stationary supporting plates 32 and 33. In the reader 30 the shell carrying the contacts rotates around the roller 31, instead of vice versa. The shell is here in the form of a hollow generally U-shaped shell 34 the arms of which each terminate in a boss 35. Each of the bosses 35 serves to mount eccentrically a shaft 36, the two shafts 36 also being mounted in fixed bearings in the supporting plates 32 and 33. Contacts similar to the contacts 4, or other feeler devices, are arranged around the base 37 of the shell 34, which base is semi-cylindrical in form. These contacts are diagrammatically illustrated in Figures 6 and 7 at 38. Various different types of feeling and/or punching devices that may be substituted for the contacts 4 are described in more detail below. As in the previous reader 1, the roller 31 is arranged in rolling contact with the base 37 of the shell, and punched paper tape 39 extends over the roller 31 between its surface and that of the shell.

Synchronous rotation of the two shafts 36 will cause the shell 34 to execute an orbital movement as a single unit and thus to move the inner surface of the base 37 of the shell 34 around the roller 31 while maintaining contact therewith. If the roller 31 is also rotated at a constant speed corresponding to the movement of the shell 34, a form of rolling contact similar to that obtained in the reader 1 takes place between the series of feelers 38 on the base 37 and the punched paper tape 39 with advancement of the tape, although such advancement is at a constant speed instead of sinusoidal.

Figure 6:
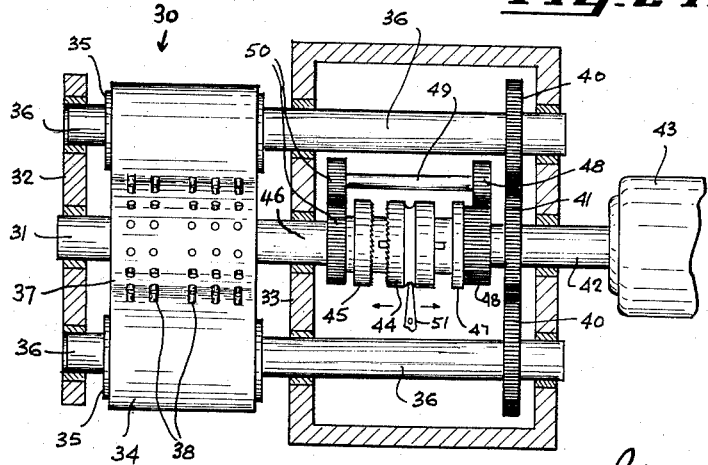
Figure 6 is a diagrammatic plan view of a modified form of reader for punched paper tape.

The right-hand half of Figure 6 shows a gear mechanism for driving the reader 30. The shafts 36 are constantly driven at the same speed by gears 40 and 41 from a shaft 42 extending from a constant speed motor 43. The shaft 42 is also connected to a slidably mounted clutch member 44 which, by movement to the left, may be caused to engage ratchetwise with a complementary clutch disk 45 mounted on a shaft 46 forming an extension of the roller 31. Movement of the clutch member 44 to the right will cause it to come into frictional engagement with a second clutch plate 47 that is freely mounted on the shaft 44 and is connected through gearing 48, a subsidiary shaft 49 and further gearing 50, to the shaft 46. Movement of the clutch member 44 to the left is for normal running, i. e. with the roller rotating at a speed corresponding to the linear motion of the inner surface of the base 37 of the shell 34, while movement of the clutch member 47 to the right causes the roller 31 to rotate somewhat faster and thus speed up the paper feed without changing the movement of the rest of the mechanism. Movement of the clutch member 44 is controlled by a conventional pivoted fork 51.

Considering now the forms that the tape may adopt, it will be clear that the manner of storing information on the tape may be other than by punched holes, and virtually any property of the medium that can subsequently be detected at the time of reading may be altered in the recording process. Examples of such properties are physical thickness, electric conductivity, transparency and colour variations.

Nevertheless, punched holes are a very convenient method of storing intelligence that has already been widely adopted. When holes are used, they may be detected in a number of different ways. Firstly, an electric circuit may be established through the holes themselves, as in the reader 1, or through electrically conducting ink soaked into the material of the tape. A reader with contacts 4 as in the reader 1 will be able to read either type of tape. Secondly, a magnetic circuit may be established through the tape. The flux linking this circuit will depend on the thickness of the gap between poles. The flux will thus be relatively high if there is a hole and relatively low if there is no hole, and it is calculated that a reluctance ratio as high as 100 to 1 between hole and no-hole conditions can be obtained. Such a system will be sensitive to tape thickness so that the recording can be by crushing certain areas. In a third method there may be no direct electrical or magnetic circuit established through the tape itself, the feeler being arranged to extend through the tape when a hole is present into a suitably located recess in the feeler. If there is no hole, the feeler will, of course, remain above the tape and not enter the recess. Motion of the feeler into the recess can then serve to modify a separate electrical or magnetic circuit. This method can be used with so-called "chadless" punching in which perforations are made in the medium but no material is actually removed.

Figures 8 to 12 are concerned with various forms of feelers, other than simple electrical contacts, that may be employed for reading punched tape.

Figure 8:
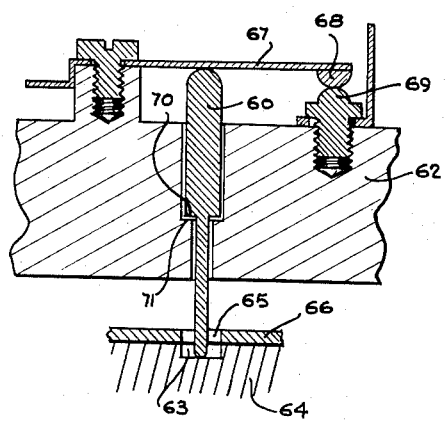
Figure 8 is a detailed but diagrammatic view of one form of feeler device for use in a reader such as illustrated in the foregoing figures.

Figure 8 shows a form of feeler operating in the third manner referred to above to control an independent electric circuit. Here the feeler 60 is slidable in a shell 62 into and out of a recess 63 in a roller 64, subject to alignment with such recess 63 of a hole 65 in the tape 66. The other end of the feeler 60 engages a resilient arm 67 bearing a movable contact 68 adapted to engage a stationary contact 69 on movement of the feeler 60 into a recess 63. The resilient arm 67 serves to urge the feeler 60 towards the roller 64, the feeler's movement in that direction being limited by an annular shoulder 70 on the feeler 60 and a complementary surface 71 on the shell 62.

Figure 9:
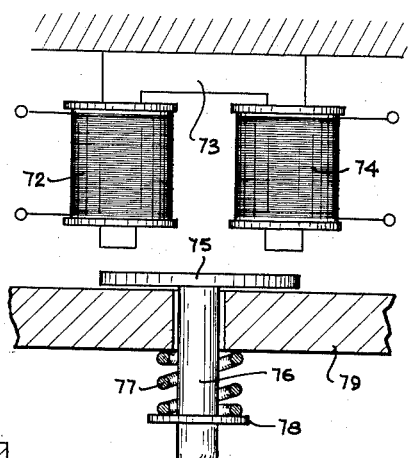
Figures 9 to 12 show on much enlarged scales further forms of feeler devices for use in such readers.

A variation of the arrangement seen in Figure 8, in which the feeler varies the properties of a magnetic circuit, is seen in Figure 9. Here a suitable alternating current is applied to a coil 72 arranged on one leg of a U-shaped magnetic core 73. A detecting coil 74 is arranged on the other leg of this core and the magnetic circuit is arranged to be completed by a bar armature 75 connected to the inner end of the feeler 76 which is urged downwardly towards a roller (not shown) by a spring 77 acting between a transverse pin 78 on the feeler 76 and a fixed portion 79 of the shell of the reader. The alternating current applied to the coil 72 will cause a large current to be induced in the coil 74 when the armature 75 is raised and a small current when it is lowered.

Figure 10:
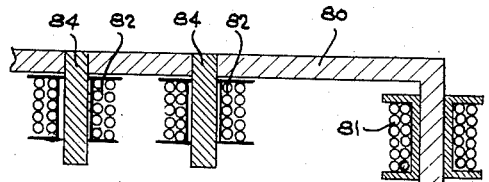

Figure 10 shows a further modification of a feeler arrangement employing a magnetic circuit. Here a magnetic circuit is established through a core 80 which bears an energizing coil 81 and a multiplicity of detecting coils 82 each arranged on a pin 84. Each pin 84 is made of a material having a square hysteresis loop and cooperates with a slidable feeler 83 of magnetic material to form a multiplicity of parallel paths within the magnetic circuit of the core 80, sliding movement of any of the feelers 83 acting to open or close an air-gap in the corresponding magnetic path. The coil 81 is initially pulsed with a large current which magnetically saturates the pins 84, and then a small permanent current is passed through coil 81 in the opposite direction. With appreciable air-gaps between each of the pins 84 and its corresponding feeler 83, the small current in the coil 81 will be insufficient to reverse the direction of flux saturation in any of the pins 84. When, however, a feeler 83 is raised, its corresponding air-gap will be eliminated and the reluctance of the magnetic circuit through the corresponding pin 84 greatly reduced. The flux in the pin 84 will then suddenly be reversed and a pulse will appear at the output of the coil 82 surrounding such pin.

In the construction shown in Figure 10, the coil 81 is common to the magnetic circuits of a number of feelers 83, conveniently the feelers of one row in the shell of the reader, but the coil 81 may even be common to the feelers of a number of such rows. A generally similar type of construction is employed in the embodiment shown in Figure 11, except that here a separate coil 85 is provided for each feeler 86. The feelers 86 each carry a bar 87 of magnetic material arranged to be moved into and out of a position in which it bridges a gap in a magnetic core 89. A coil 88 on the core 89 serves for detection.

Figure 11:
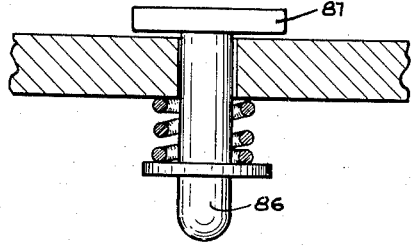

A convenient method of employing a system such as shown in Figure 11 is to connect in series all the coils 88 of each feeler 86. The coils 85 can then be pulsed sequentially. For this purpose it is convenient to form each coil 85 as a pair of coils or as one center-tapped coil and to pulse these coils in the manner adopted in selection of a 2-dimensional core storage array.

Figure 12:
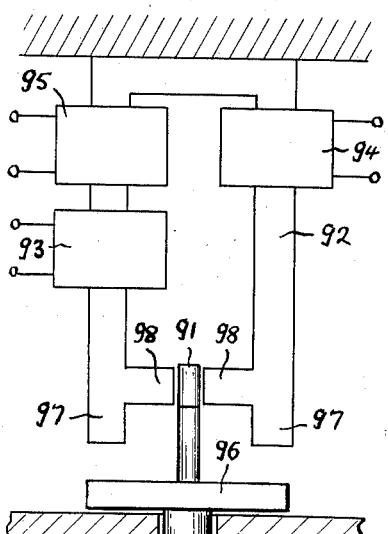

A further modified form of construction is shown in Figure 12. Here each feeler 90 carries an extension 91 of low coercive force iron arranged in an air gap in a magnetic core 92 made of a material having a square hysteresis loop. This construction can act as a storage core. Three windings are provided: a read-in winding 93; a read-out winding 94 and a shift winding 95. The read-out winding 94 of each feeler 90 is connected to the read-in winding 93 of the next such feeler to form a cascade connected series. The first feeler 90 of such series will not require a read-in coil 93 on its core 92. A cross-arm 96 consisting of a permanent magnet is also connected to each movable feeler 90, this cross-arm being normally in spaced relation to a pair of poles 97 on the core 92. When each feeler 90 is operated, i. e. raised, its magnet 96 will have the effect of saturating the core 92 in one direction, the air gap plug 91 being at this time removed from its position between a second pair of poles 98 on the core 92.

In operation, every core 92 is first saturated in one direction, designated the "0" state, as a result of a previous shifting operation. If the feeler 90 rises, the magnet 96 will induce flux in the core 92 sufficient to saturate it in the opposite direction, designated the "1" state. At a suitable moment after the reader has performed a reading operation on one block of a punched record sheet, the information that will now be stored in each of the cores 92 will be read out by a sequence of shift pulses.

This operation takes place as follows:

Firstly, a shift pulse is passed to the shift winding 95 of the first core 92 in the series. This will be a pulse in the direction effective to return the core 92 to the "0" state, if it is not already in this state. (It will be in the "0" state if the feeler 90 has not been raised.) In this case a pulse in the direction corresponding to the "0"

state will appear at the read-out winding 94. If the core 92 had been saturated to the "1" state by raising of the feeler 90, then a pulse in the opposite direction (corresponding to the "1" state) would appear at the read-out winding 94, while the core 92 would be returned to the "0" state. The read-out winding 94 of this core 92 is connected to the read-in winding 93 of the next core in the series so that the impulses emitted by the read-out winding 94 of the first core 92 will have the effect in the read-in winding 93 of the next core 92 of saturating such second core 92 either to the "0" state or to the "1" state depending upon the nature of the pulse emitted by such read-out winding 94. It will be appreciated that the same operation will have been taking place simultaneously in all the cores 92, in that each will have simultaneously received a shift pulse in its respective shift winding 95. Thus, the second core 92 the condition of which is now determined by the pulse emitted by the read-out winding 94 of the first core 92, will previously have emitted from its own read-out winding 94 (on actuation by a shift pulse synchronous with the shift pulse applied to the first core) a pulse which is either of the "0" or "1" state depending upon whether its feeler 90 had been raised. The second core 92 will thus have been returned to the "0" state prior to receipt of the pulse from the read-out winding 94 of the first core 92. This latter pulse, depending on its nature, will thus serve either to leave the second core 92 in the "0" state, or to change it to the "1" state.

This form of operation on a series of cores 92 will have the effect of causing the predetermined state of each core 92, as determined by the operation or non-operation of its feeler 90, to be passed on to the next core of the series. It will then only require a sequence of shift pulses applied to all shift windings 95, equal in number to the number of cores 92 in the series, for the whole of the information stored in each core 92 to be passed along the series from core to core and finally to emerge sequentially at the read-out winding 94 of the last core in the series. To exemplify this, let it be assumed that a series of five cores 92 had been set by their respective feelers 90 during a reading operation to the following states:

|  | Core 1 | Core 2 | Core 3 | Core 4 | Core 5 | Read Out |
|---|---|---|---|---|---|---|
| Initial state | 1 | 1 | 0 | 0 | 1 | |

After one shift pulse has been passed to each of the shift windings, the states of the cores will have advanced by one position. The cores will then be in the following states:

|  | Core 1 | Core 2 | Core 3 | Core 4 | Core 5 | Read Out |
|---|---|---|---|---|---|---|
| After one shift pulse | 0 | 1 | 1 | 0 | 0 | 1 |

The "1" state in which core 5 initially stood will have been passed in the form of a "1" impulse out of the final read-out winding 94.

After a second shift pulse has been applied to all the shift windings 95 the condition of the cores will be as follows:

|  | Core 1 | Core 2 | Core 3 | Core 4 | Core 5 | Read Out |
|---|---|---|---|---|---|---|
| After second shift pulse | 0 | 0 | 1 | 1 | 0 | 01 |

This time a "0" state pulse will have been emitted by the read-out winding 94 of the final core. Continuing in this same manner to pulse the shift windings three more times, will result in the following states of the cores:

|  | Core 1 | Core 2 | Core 3 | Core 4 | Core 5 | Read Out |
|---|---|---|---|---|---|---|
| After three shift pulses | 0 | 0 | 0 | 1 | 1 | 001 |
| After four shift pulses | 0 | 0 | 0 | 0 | 1 | 1001 |
| After five shift pulses | 0 | 0 | 0 | 0 | 0 | 11001 |

It will be observed that the pulses emitted by the read-out winding 94 of the final core will be: 10011 which is, in reverse order, the initial state of the cores. It will also be noted that all the cores have been returned to the "0" state.

The cores can thus be said to have been connected as a shifting register. It will be appreciated that the sequence of shifting pulses follows closely one upon the other and that the whole series of cores, which may be far greater in number than five, will be read-out and reset to 0 between each reading operation, that is to say between successive orbital movements of the roller in the reader.

Devices of the character so far described may be adapted for the punching of paper tape, instead of for the reading of already punched tape. The apparatus will be substantially identical when used as a punch instead of as a reader, except that punch pins will be substituted for the contacts or other feelers disposed around the shell and the roller will be a die roller instead of a reading roller. The most convenient method of operating a punch pin is to move it inwardly towards the central shaft and clamp it in such inward position. When the roller rolls the paper against such a clamped pin it will force the paper over the pin to form a hole. All the energy required for effecting penetration is then supplied by the motor driving the shaft and not by the mechanisms which move the punch pins. When a punch pin is not clamped, the roller will simply move it back from the path of the roller with insufficient force to penetrate the paper.

If through holes are punched, the chads may be removed from the interior of the roller, which will then be hollow. To avoid the necessity of removing the chads, chadless punching is preferred. Spherical or conical-ended punch pins are best suited to this function.

The punch pins may be clamped in positions by mechanical or electrical means, and some examples are illustrated in Figures 13 to 16. Figure 13 shows a punch pin 100 slidably mounted in a shell 101 and resiliently urged towards the roller (not shown) by a spring 102. When the pin is not required to punch, it will be allowed freedom to slide in the shell 101 so that as the roller presses upwardly against it there will be insufficient force existing between the roller and the punch to form a hole in the tape. When the pin is required to punch, a solenoid 103 will be energized and this will attract a pivoted armature 104 which forms one arm of a bell crank lever. The other arm 105 of the bell crank lever is moved by attraction of the armature 104 into engagement with a shoulder 106 formed on the punch pin 100. This action effects locking of the punch pin 100 which is thus held firmly in place when the roller presses the paper against it.

A variation of such a punch pin is seen in Figure 14, where a punch pin 107 is provided with a saw tooth surface 108 arranged for co-operation with a complementary saw tooth surface 109 formed on a resilient arm 110. The punch pin 107, the arm 110 and a collar 111 in which the punch pin slides, together form a magnetic circuit that may be energized by a coil 112. A spring 113 urges the punch pin 107 towards the roller and energization of the coil 112 will cause movement of the arm 110 to engage the surfaces 108 and 109 and thus lock the punch pin 107 in its operative position.

The punch pin may be simply mechanically operated, if desired, for example as shown in Figure 15, where the inner surface of a punch pin 114 is acted upon by one arm of a bell crank lever 115 controlled by a wire or rod 116. This wire or rod can be taken off in any direction: this arrangement allows for very close spacing of the many punch pins arranged in the shell of the device.

Figure 16 illustrates a further possible modification in which a punch pin 117 is slidably mounted within a coil 118. A thin layer 119 of a suspension of iron dust in oil surrounds the extended shank of the pin 117. When the coil 118 is energized, the magnetic field inside the coil causes virtual solidification of the iron dust and exerts a strong binding action on the shank of the pin 117. When no magnetic field is present, the pin can move freely. As before, the punch pin is urged outwardly by a spring 120. This form of construction facilitates miniature construction which allows very close hole spacing to be used.

It will normally be desirable to provide some means to ensure positively that the punch is extracted from the hole it forms, or, more accurately, that the paper is pulled away from the punch pin. This can conveniently be accomplished by comparatively strongly sprung bars (not shown) lying between the rows of punch pins on the inner surface of the shell. These bars will be raised when the roller presses against them and will push outwardly as the roller moves away, thereby acting to strip the paper from the punch pins.

The cooperation between the pins and the die roller is shown in Figure 25. The particular pin structures are the same as the one described with reference to Figure 16. Of course, any of the other pin structures shown in Figures 13–15 could also be used. When one of the coils 118 is energized, the corresponding pin 117 is locked in position so that the pressure of the paper will not force the pin upwardly and the pin will be forced through the paper into the die holes 170 in the die roller 172. If the coil is not energized, the pin will be forced away from the roller by the pressure of the paper and no hole will be punched in the paper as has already been described. In order to insure registration of the pins with the die holes, the same type of gearing is used as was described with reference to the reader. A spur gear 174 is provided at one end of the roller 172 meshing with an internally toothed ring gear 175 fixedly mounted on the base 13. The spur gear will then roll around the ring gear as a planet wheel as described above. If desired, this gearing could be used at both ends of the roller 172. It is not necessary that die holes be used in the die roller. Instead, grooves could be used running circumferentially around the roller 172 or a resilient roller could be used such as a typewriter platen. With such die rollers it would not be necessary to use the gearing to insure registration.

It is possible to arrange that the same pin can act either as a feeler or as a punch. This can be done, for example, by providing any one of the feelers described in Figures 8 to 12 with a latching arrangement such as shown in one of Figures 13 to 16. One device could then act either as a reader or a punch. Where the hole in the paper is to be completely punched, the feeler pin should preferably be somewhat smaller than the punch pin, to ensure that the feeler pin will easily enter and leave the hole. This can be provided for in the same pin by using a pin of the shape shown in Figure 17. This pin consists of a main cylindrical portion 121 which acts as the punching element, but includes a narrower extension 122 which will act as the feeler element.

Readers such as the reader 1 and the rear 30 are particularly adaptable for feeding into a parallel computer, since the holes in any one line are read simultaneously and those in any one block are read substantially simultaneously. Thus to connect such a reader to a parallel computer is particularly simple since each reading feeler can be connected permanently and directly to one binary storage unit of the input register of the computer, with parallel gating arrangements for feeding out from such register operated once per revolution of the shaft, such as by the contacts 20 and 21.

If such a reader is to be connected to a serial computer it is convenient to connect each feeler permanently and directly to one stage of a shifting register and then to shift out the information as determined by clock pulses, unless the type of system described with reference to Figure 12 is employed, where the cores themselves are connected as a shifting register. Shifting can then be started by means of a triggering pulse supplied once per revolution after a block of holes has been read, e. g. by the contacts 20 and 21. It is only necessary for shifting to be completed before the next block begins to be read. As long the the clock rate is sufficiently fast, synchronization tolerances can be comparatively wide.

It is, however, possible for the reader itself to generate a serial pulse train without the need of an auxiliary register, by using either an electric or a magnetic commutator. Electric commutators are well-known and an example will therefore be given of a magnetic commutator for which purpose reference should be made to Figure 18. This illustration shows a roller 130 of a reader which serves to bring a tape 131 into reading relationship with a typical row of feelers 132. Each of these feelers 132 is arranged to complete an independent magnetic circuit through the roller 130; crank arm 133; shaft 134; a radially extending bar 135 secured to said shaft 134; and one of a number of rods 136, each of which forms a continuation of a feeler 132. Two coils 137 and 138 are mounted around the shaft 134 which is driven by a motor 139. A direct current, represented by the generator 140, is maintained in the coil 137 and this current tends to set up a flux in each of such magnetic circuits as the commutating bar 135 comes into register with one of the rods 136. If the minimum air gap between the commutating bar 135 and each rod 136 is comparatively small, the reluctance of each such circuit will depend principally on the air gap between the corresponding feeler 132 and the roller 130, which reluctance in turn will depend upon the presence or absence of an aligned hole in the paper 131. As the commutator bar 135 approaches and passes each rod 136, a pulse will appear across the coil 138—a large pulse if there is a hole in the paper 131—a small pulse if there is no hole. As the commutator bar 135 passes the rods 136 sequentially, the train of pulse induced in the coil 138 will be a serial train representing the information in one block of the tape. If necessary synchronized timing pulses can be obtained by means of a second commutator (not shown), the magnetic circuits of which do not pass through the paper.

It is important to realize that it will be practical, by means of the invention, to construct a single unit which will either punch or read a record sheet. The choice of function could then be placed under automatic machine control.

Furthermore, a pair of units can be provided, one being adapted for example to accommodate I. B. M. cards and the other Remington-Rand cards. A device consisting of such a pair of units could then be used to read or punch either type of card. For example, by arranging the crank shafts of the two units in opposite phase to one another, one unit could read one kind of card, the information being decoded and recoded in a storage register, while the other unit serves to punch the other kind of card during the next half revolution of the device. The device would then act as a card translating reproducer.

Two or more such units, independently driven and each with its own shifting register, could provide a very flexible general purpose input-output device. For example, depending on the requirements of a computer from time to time, the three units could serve as; three readers; two readers and one punch; one reader and two punches; or three punches.

In some applications it may be necessary to use the device (either as a reader or as a punch) in conjunction with separate cards, rather than a continuous record tape. All the foregoing description will be equally applicable to reading and/or recording information on cards, but additional mechanism will be necessary to facilitate the feeding of independent cards through such a device.

Figures 19 to 24 illustrate diagrammatically a convenient method of feeding cards through such devices. In these drawings the device, which may be either a reader or a punch, is illustrated only in rudimentary form as consisting of a shell 150, roller 151, crank arm 152 and shaft 153. Figure 19 shows the parts in a position which may conveniently be taken as the beginning of a cycle. A fresh card 154 is about to be fed into the device from a stack of cards disposed in a container 155.

Before tracing out the cycle of operation of these parts, it will first be necessary to explain that the roller 151 is provided at one point on its periphery with a clamping mechanism illustrated in detail in Figures 23 and 24, Figure 23 showing the mechanism in its clamping position and Figure 24 showing it in its released position. This clamping mechanism, designated generally at 156, consists of a pair of pivotally mounted clamping plates 157 secured within a recess formed by a closed wall 158 that projects slightly from the surface of the roller 151. Each of the clamping plates 157 bears a serrated under-surface 159 on a part that projects outwardly from the recess formed by the wall 158. The plates 157 may pivot from the Figure 23 position in which the serrated under-surfaces 159 of these plates extend parallel to and slightly above the peripheral surface of the roller 151, the spacing between the roller surface and each of the serrated surfaces 159 being slightly less than the normal thickness of the cards to be fed through the device, and the Fig. 24 position in which the plates 157 are swung away from the roller surface to extend substantially perpendicularly thereto. Control of the position of the clamping plates 157 is exercised by a leaf spring 160 which connects the two adjacent edges of the respective clamping plates 157. This spring 160 will act to retain the clamping plates 157 in either of the extreme positions, i. e. Figure 23 or Figure 24, into which they may be moved.

At the input edge of the shell 150 there is provided a pair of spaced fixed projections 161 positioned for co-operation with the clamping mechanism 156. As the roller is brought to the position shown in Figure 19 by anti-clockwise rotation of the shaft 153, its surface bearing the clamping mechanism 156, which mechanism has hitherto been in the open position, is moved generally radially outwardly into contact with the two projections 161. Each of these projections 161 is so positioned as to be at the cusp point of the path of travel of one of the clamping plates 157, so that the outward pressure of the roller 151 causes these clamping plates 157 to be forced downwardly and outwardly into the clamping position (Figure 23). The fresh card 154 will be urged by means within the container 155 to press its leading edge against the abutment formed by the wall 158 of the clamping mechanism 156, so that the left hand clamping plate 157 will descend on the leading edge of such card and grip the same between its own serrated under-surface 159 and the surface of the roller 151.

The shaft 153 continues to rotate and the positions achieved by the parts after a 90° rotation of the shaft are seen in Figure 20. While the shaft 153 turns anti-clockwise through 90°, the roller 151 will have turned clockwise through 90° relatively to the shell 150 (180° relatively to the crank arm 152), since the radius of the roller 151 is equal to the length of the crank arm 152. The clamping mechanism 156 will thus be brought to a position in line with the shaft 153 and the card 154 will be drawn into the interior of the shell 150.

When, after rotation of the shaft 153 through a further 90°, the parts take up the positions seen in Figure 21, the clamping mechanism 156 will be positioned at the output edge of the shell 150, diametrically opposite the pair of projections 161. At this output edge of the shell 150 there is provided a projecting ridge 162 extending parallel to the axis of the shaft 153, this ridge being of comparatively narrow dimension in the circumferential direction of the shell. The clamping mechanism 156 will be pressed against the ridge 162 with such ridge in register with the center of the spring 160 joining the clamping plates 157. Pressure between these parts will force the spring 160 inwardly of the recess formed by the wall 158 which will have the effect of bringing the parts of the clamping mechanism 156 into the released position shown in Figure 24. By this time the card 154 will have been drawn almost wholly into the interior of the shell 151 and will be in a position in which it is held within the shell by contact pressure between such shell and the roller 151. After release of the clamping mechanism 156, this pressure between the shell and the roller will be the only force maintaining the card 154 correctly positioned within the shell 150.

The shaft 153 on continuing to rotate passes through the position shown in Figure 22 during the course of a reading or punching operation such as described with reference to the foregoing figures. The leading edge of the card 154 will bear against a leaf spring 163 permanently mounted at the output edge of the shell 150. This spring 163 will act to initiate discharge of the card 154 from the device through an aperture defined between the spring 163 and a fixed lip 164.

Eventually the parts again assume the position shown in Figure 19, after the completion of a whole cycle, and the original card 154 will now be in the position designated 154' in this figure. The clamping mechanism 156 will again be moved to its clamping position by the projections 161 so as both to clamp the leading edge of the new incoming card and also to clamp the trailing edge of the outgoing card 154'. This outgoing card is thus positively fed out of the device as the parts continue with the next cycle, until the position seen in Figure 21 is again achieved when the ridge 162 serves to unclamp the clamping mechanism 156 and finally release the card 154' and allow it to fall from the device into a suitable bin (not shown).

I claim:

1. A device for reading a punched flexible record sheet, comprising a shell having a concave partially cylindrical surface, at least one radially movable feeler urged to project from said surface, means for detecting outward radial movement of said feeler, a cylindrical read-out roller of lesser external diameter than twice the radius of curvature of said concave surface, and means for causing relative movement between said roller and said shell such that relatively to said shell the central longitudinal axis of said roller describes a circular orbit about the longitudinal axis of said concave surface while said roller itself rotates about its central longitudinal axis with its outer surface in rolling contact with said concave surface with the punched record sheet interposed therebetween, and such that said orbital movement of said roller is effective to cause stepwise advancement of the punched record sheet to bring successive areas thereof into contact with said feeler.

2. A device as claimed in claim 1, including a plurality of radially movable feelers each urged to project from the concave surface of said shell and disposed as a circumferentially extending series around said shell, the difference between 2 π times the radius of curvature of said concave surface and π times the external diameter of said roller being at least as great as the length of said series.

3. A device as claimed in claim 2, wherein the external diameter of said roller is substantially equal to the radius of curvature of said concave surface.

4. A device as claimed in claim 1, including a fixed support for said shell, said means for causing relative movement between the roller and the shell comprising means for causing the central longitudinal axis of said roller to describe a circular orbit about the longitudinal axis of said concave surface.

5. A device as claimed in claim 1, including fixed bearing means supporting said roller for rotation about its central longitudinal axis, said means for causing relative movement between said roller and said shell comprising means for causing said shell to describe an orbit about the central longitudinal axis of said roller.

6. A device as claimed in claim 1, including a pair of electrical contacts, one such contact being secured to said shell and the other such contact being secured to said movable feeler.

7. A device as claimed in claim 1, including a magnetic circuit having two relatively movable parts, one such part being secured to said shell and the other such part being secured to said movable feeler, and means sensitive to modification of the characteristics of said magnetic circuit consequent upon relative movement of said parts.

8. A device as claimed in claim 7, wherein the part of said magnetic circuit secured to said shell comprises a magnetic core of material having a square hysteresis loop and the part of said magnetic circuit secured to said movable feeler comprises magnetic material movable into and out of an air gap in said core, said sensitive means comprising a coil around said core.

9. A device as claimed in claim 7, wherein the part of said magnetic circuit secured to said shell comprises a magnetic core of material having a square hysteresis loop and the part of said magnetic circuit secured to said movable feeler comprises a permanent magnet movable into and out of close magnetic relationship with said core, said sensitive means comprising a coil around said core.

10. A device as claimed in claim 9, including a series of said cores each associated with a movable feeler, a read-out coil on each core, a read-in coil on each but the first core, each read-in coil being connected to the read-out coil of the preceding core, and a shift coil on each core.

11. A device for reading a flexible record sheet, comprising a shell having a concave partially cylindrical surface, at least one feeler mounted on said surface, said feeler being sensitive to the state of a predetermined property of said record sheet, a cylindrical read-out roller of lesser external diameter than twice the radius of curvature of said concave surface, and means for causing relative movement between said roller and said shell such that relatively to said shell the central longitudinal axis of said roller describes a circular orbit about the longitudinal axis of said concave surface while said roller itself rotates about its central longitudinal axis with its outer surface in rolling contact with said concave surface with the record sheet interposed therebetween, and such that said orbital movement of said roller is effective to cause stepwise advancement of the record sheet to bring successive areas thereof into contact with said feeler.

12. A device for punching holes in a flexible record sheet, comprising a shell having a concave partially cylindrical surface, at least one radially movable punch urged to project from said surface, means for locking said punch in its projecting position, a cylindrical die roller of lesser external diameter than twice the radius of curvature of said concave surface, and means for causing relative movement between said roller and said shell such that relatively to said shell the central longitudinal axis of said roller describes a circular orbit about the longitudinal axis of said concave surface while said roller itself rotates about its central longitudinal axis with its outer surface in rolling contact with said concave surface with the record sheet interposed therebetween, and such that said orbital movement of said roller is effective to cause stepwise advancement of the record sheet to bring successive areas thereof into register with said punch.

13. A device as claimed in claim 12, including a plurality of radially movable punches each urged to project from the concave surface of said shell and disposed as a circumferentially extending series around said shell, the difference between $2\pi$ times the radius of curvature of said concave surface and $\pi$ times the external diameter of said roller being at least as great as the length of said series.

14. A device as claimed in claim 13, wherein the external diameter of said roller is substantially equal to the radius of curvature of said concave surface.

15. A device as claimed in claim 12 including a fixed support for said shell, said means for causing relative movement between the roller and the shell comprising means for causing the central longitudinal axis of said roller to describe a circular orbit about the longitudinal axis of said concave surface.

16. A device as claimed in claim 12, including fixed bearing means supporting said roller for rotation about its central longitudinal axis, said means for causing relative movement between said roller and said shell comprising means for causing said shell to describe an orbit about the central longitudinal axis of said roller.

17. A device for carrying out a reading or punching operation on a series of individual identical record cards, said device comprising a shell having a concave cylindrical surface, means at said surface for effecting said operation, a cylindrical roller of external diameter equal to the radius of curvature of said concave surface, means for causing the central longitudinal axis of said roller to describe a circular orbit about the longitudinal axis of said concave surface and for causing the roller itself to rotate about its central longitudinal axis with its outer surface in rolling contact with said concave surface, first releasable gripping means disposed on the periphery of said roller for gripping the leading edge of a card projecting into the device from an axially extending intake aperture, in said shell, a projection secured to said shell adjacent said intake aperture for cooperation with said gripping means to move the same to gripping position on movement of said gripping means generally radially towards said projection, a projection secured to said shell adjacent an axially extending outlet aperture in said shell opposite said intake aperture, the last-mentioned projection being positioned for cooperation with said gripping means to move the same to released position on movement of said gripping means generally radially towards the last-mentioned projection, second releasable gripping means disposed on the periphery of said roller adjacent said first gripping means for gripping the trailing edge of a card drawn into the device by said first gripping means, a projection secured to said shell adjacent said intake aperture for cooperation with said second gripping means to move the same to gripping position on movement of said second gripping means generally radially towards the last-mentioned projection, and a projection secured to said sell adjacent said outlet aperture for cooperation with said second gripping means to move the same to released position on movement of said second gripping means generally radially towards the last-mentioned projection.

18. In a device for carrying out operations on a series of individual identical cards, said device comprising a shell having a concave cylindrical surface, means at said surface for effecting said operation, a cylindrical roller of external diameter equal to the radius of curvature of said concave surface, and means for causing the central longitudinal axis of said roller to describe a circular orbit about the longitudinal axis of said concave surface and for causing the roller itself to rotate about said central longitudinal axis with its outer surface in rolling contact with said concave surface, the provision of releasable gripping means disposed on the periphery of said roller for gripping the leading and trailing edges of cards presented to said device through an axially extending intake aperture in said shell and discharged from said device through an axially extending outlet aperture arranged in said shell opposite said intake aperture, closing means secured to said shell adjacent said intake aperture adapted to move said gripping means to gripping position on movement thereof generally radially towards said closing means, and release means secured to said shell adjacent said outlet aperture adapted to move said gripping means to release position in movement thereof generally radially towards said release means.

References Cited in the file of this patent

UNITED STATES PATENTS

| | | |
|---|---|---|
| 2,583,086 | Carpenter | Jan. 22, 1952 |